Figures 1, 2:
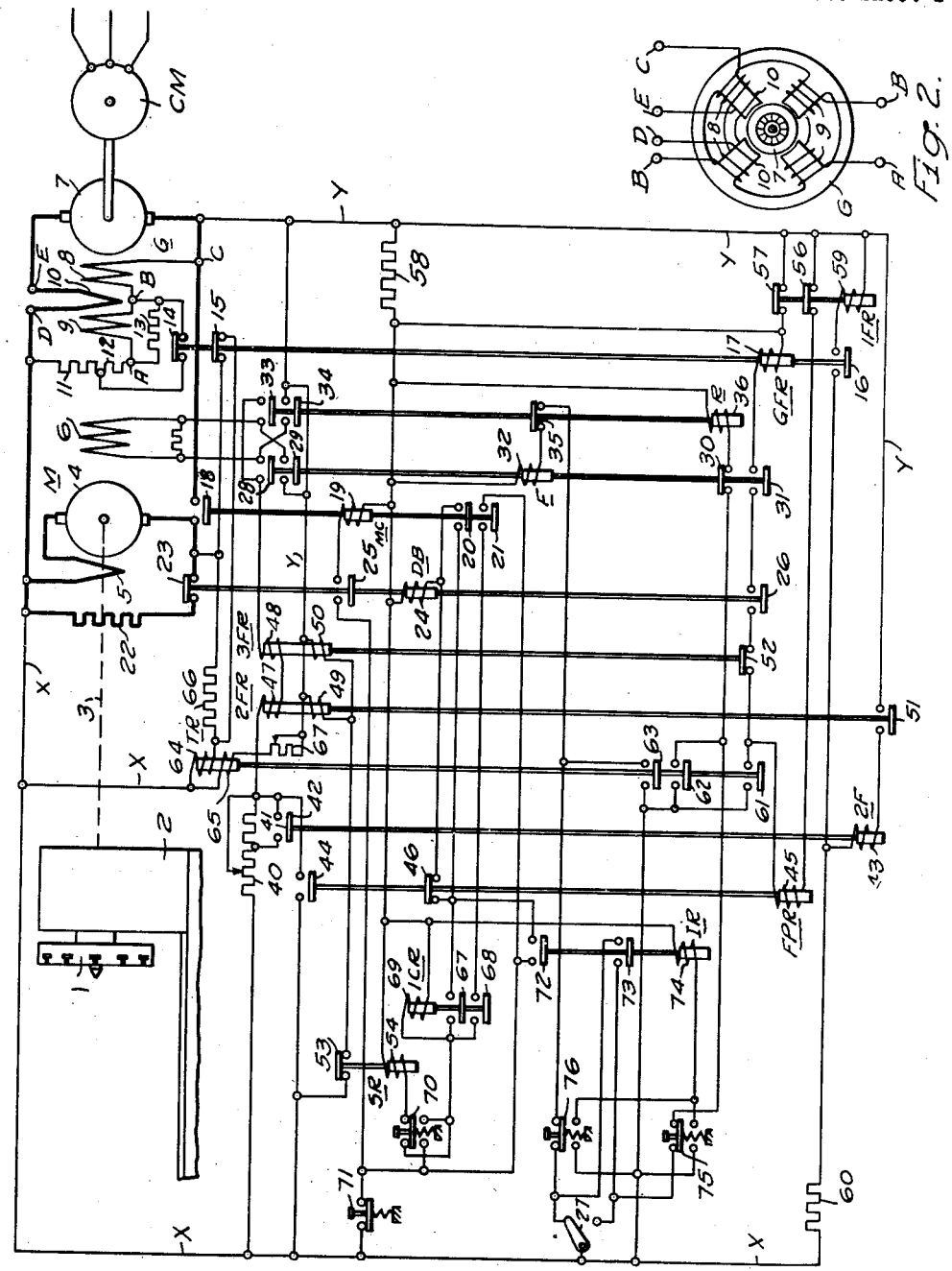

INVENTORS
George E. King and
Martin H. Fisher.
BY Paul E. Friedemann
ATTORNEY

Jan. 18, 1949.    G. E. KING ET AL    2,459,655
ADJUSTABLE SPEED DRIVE
Filed Dec. 15, 1945    2 Sheets-Sheet 2
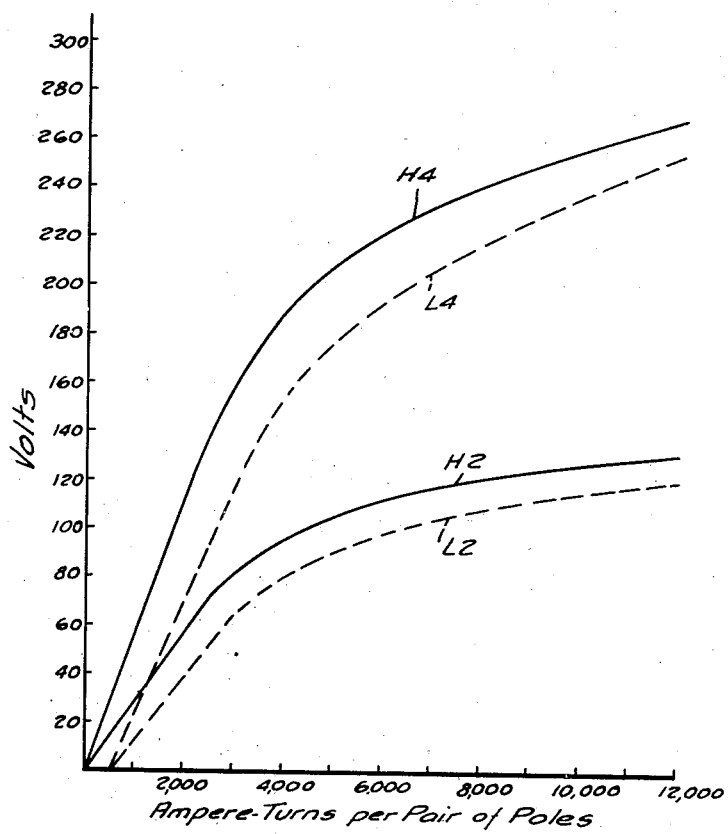
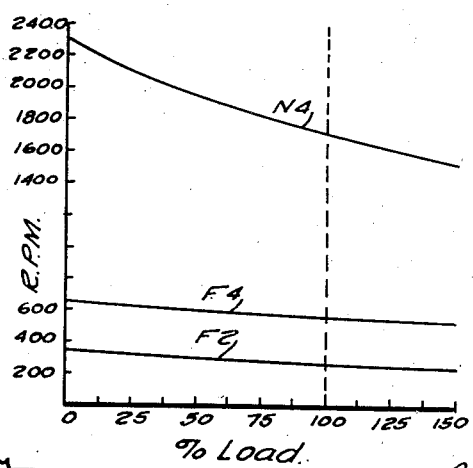
WITNESSES:
INVENTORS
George E. King and
Martin H. Fisher.
BY
Paul E. Friedemann
ATTORNEY Patented Jan. 18, 1949

2,459,655

UNITED STATES PATENT OFFICE 2,459,655

ADJUSTABLE SPEED DRIVE

George E. King and Martin H. Fisher, Pittsburgh, Pa., assignors to Westinghouse Electric Corporation, East Pittsburgh, Pa., a corporation of Pennsylvania Application December 15, 1945, Serial No. 635,349

9 Claims. (Cl. 318—151)

Our invention relates to adjustable speed drives in which a field-controlled direct-current generator provides voltage for a variable-speed motor.

It is an object of the invention to devise an adjustable speed drive of the type mentioned in which the generator for energizing the drive motor provides also the energy required for exciting the appertaining control equipment so as to eliminate the necessity of using an additional exciter or current source for operating the relays or other control apparatus of the drive system.

Another object of our invention is the provision of a drive of the type mentioned which permits the operator to vary the speed of the drive motor from a high to a low value and vice versa by merely actuating a contact, for instance, of the push-button type.

The significance of these objects will be appreciated from the example of an electric drive for a wheel lathe. When turning engine driving wheels on such a lathe, hard spots on the circumference of the wheel to be turned are encountered. In order to protect the cutting tool as well as the work piece, the speed of the revolving wheel must be reduced when such hard spots approach the tool until the tool has passed over the spots, whereafter the speed is increased to its former value. In drive systems previously available, this slow down is accomplished by shunting the armature of the drive motor which method requires a rather heavy and expensive control equipment, or by using a variable voltage system in which an exciter generator is caused to vary the field excitation of main generator and drive motor.

Referring to requirements of the kind just mentioned, our invention, in accordance with the broader objects above stated, aims more specifically at devising a system which permits readily a speed variation over a relatively wide range, for instance of six to one, without requiring an armature shunting equipment for slowing down the drive motor and without the necessity of adding an exciter generator to the system. Since a reduction in the number of units of rotating equipment required for performing a given job results in smaller initial cost and smaller maintenance cost, the advantages obtainable by a system according to the above-mentioned objects of the invention will become readily apparent.

In order to achieve these objects and advantages, as well as additional improvements apparent from the following description, we provide a direct-current drive system with a generator which has several sets of field windings so arranged as to permit obtaining selectively a high voltage or low voltage output at the normal generator speed of rotation, or/and we energize the appertaining control equipment by voltage generated by the same generator and provide the equipment with means for automatically preventing the changes of the generated voltage from affecting the operation of the relays of the equipment, as will be understood from the embodiment exemplified by the drawing and explained below.

In the drawing, Figure 1 represents the basic circuit diagram of an adjustable speed drive for a wheel lathe, Fig. 2 shows schematically and more in detail the generator of the same system, Fig. 3 is a diagram of voltage characteristics of the generator, and Fig. 4 a speed-load diagram of the appertaining drive motor.

In the following, reference will be made to examples of numerical values of speed, speed ratio, voltage, voltage ratio, number of speed or voltage steps, and electric loads. These numerical examples, as well as the data apparent from the diagrams of Figs. 3 and 4, refer all to one and the same specific drive system that was designed for affording a total speed range of six to one, covered by a three-to-one range due to field control of the drive motor and a two-to-one range by control of the generator voltage. This system was further designed for a normal minimum voltage of 110 volts and a normal high voltage of about 230 volts, and the appertaining drive motor was rated to operate over a speed range of 575 to 1725 R. P. M. at high generator voltage and at a lowest speed of 285 R. P. M. at low generator voltage, these speed values referring to 100% rated load on the motor (see Fig. 4). It should be understood, however, that all numerical values mentioned in this specification are presented merely for facilitating a complete understanding of our invention and can be modified and differently correlated to suit requirements and desiderata different from those underlying the specific system chosen for exemplification.

According to Fig. 1, the rotor 1 of a wheel lathe 2 is connected by a suitable transmission, here represented by a dash line 3, with the armature 4 of an electric drive motor M with a series field winding 5 and a separately excited field winding 6. The motor is energized by a direct-current four-pole generator G driven by a constant-speed motor CM. The armature 7 of generator G is of a conventional two-circuit design. The generator field windings 8, 9, 10 are arranged in the manner shown separately in Fig. 2. Windings 8 and 9 are shunt-connected relative to the armature 7 and arranged on different pairs of adjacent field poles. Winding 10 is series-connected in the armature circuit of the generator and arranged on the same pole pair as the shunt field winding 8. In order to facilitate comparing Fig. 2 with the corresponding portion of Fig. 1, the terminal points of the generator field windings are marked A, B, C, D, E, in both figures. The two shunt field windings 8 and 9 have equal turns so that the generator produces approximately half of its full voltage when only one of the windings (8) is energized. The voltage characteristic then obtaining corresponds to curve H2 (Fig. 3) for no-load and to curve L2 for full-load operation. The corresponding speed-load characteristics are schematically represented by curves N4 and F2 in Fig. 4 respectively. When both shunt field windings are excited, thus changing from two-pole to four-pole excitation of the generator, full voltage is obtained, as exemplified by the voltage curves H4 in Fig. 3 for no-load and L4 for full-load operation; the generator then operates as a normal self-excited direct-current machine with a speed-load characteristic between the two limit performances as shown by curves N4 and F4 in Fig. 4, depending upon the adjustment of the motor field rheostat. It is, of course, necessary to change the resistance calibration of the shunt field circuit when passing from two-pole to four-pole excitation, or vice versa. Such change in calibration is effected by means of resistors 11, 12, 13 (Fig. 1) under control by a generator field relay GFR which has two main contacts 14, 15 and an interlock contact 16 controlled by a relay coil 17.

The armature circuit of the drive motor M includes the contact 18 of a line contactor MC whose control coil 19 actuates also two interlock contacts 20 and 21. A dynamic braking resistor 22 is arranged across the motor armature 4 under control by the main contact 23 of a braking relay DB with a control coil 24 and two interlock contacts 25 and 26.

The direct-current drive motor M is a normal adjustable speed motor except that its field winding 6 is rated for full strength at half generator voltage. Winding 6 receives excitation from direct-current mains X and Y which, in the illustrated embodiment, are energized from the generator G. The excitation of motor field winding 6 is reversible under control by a forward relay F and a reverse relay R. Relay F has four contacts 28, 29, 30, 31 controlled by its coil 32, and relay R has three contacts 33, 34, 35 under control by its coil 36. The circuit of coil 32 in relay F extends through contact 35 of relay R, while the coil circuit of relay R extends through contact 30 of relay F so that these relays are electrically interlocked, permitting only one of them to be picked up at a time. The selection is determined by the chosen setting of a reversing switch 27.

The circuit of motor field winding 6 contains a rheostat 40. This rheostat permits adjusting the motor speed in a ratio of about three-to-one, for instance, from 575 to 1725 R. P. M. Part of the rheostat 40 has a short circuit connection controlled by the contact 42 of a motor field relay 2F whose control coil is denoted by 43; and the whole rheostat 40 can be shorted out by the contact 44 of a field protective relay FPR whose coil 45 actuates also an interlock contact 46.

Series-connected in the circuit of motor field winding 6 are further two coils 47 and 48 of two field weakening relays 2FR and 3FR, respectively. Each of these relays has another control coil 49 and 50 for controlling a contact 51 and 52, respectively. The coils 49 and 50 are connected in parallel relation to each other between mains X and Y under control by a slow-down relay SR whose contact 53 is controlled by a coil 54. The coils 49 and 50 are rated to operate the respective relays 2FR and 3FR without assistance from the appertaining series coil 47 or 48. The series coils 47 and 48 oppose the action of the coils 49 and 50, respectively. Coil 47 is so rated that relay 2FR, with coil 49 energized, will drop out at a given field current and speed of the motor, for instance, at approximately 2.42 amperes representing a motor speed of 1150 R. P. M. Relay 3FR is adjusted to pick up at some speed less than the drop-out speed (1150 R. P. M.) of relay 2FR, for instance, at approximately 2 amperes in the series coil 48 with coil 50 in energized condition. Relay 3FR drops out whenever coil 50 is deenergized.

The coil circuit of relay FPR extends through contact 56 of a voltage relay 1FR. Another contact 57 of this relay lies in parallel to a series resistor 58 and thus controls the energizing voltage for the above-mentioned relays R, F, MC, DB, SR, as well as for two relays IR and 1CR still to be described. The relay 1FR is adjusted to pick up at a given high percentage, for instance about 80%, of the full generator voltage corresponding to a generator voltage of about 186 volts. The coil 59 of relay 1FR is preferably rated for a low pick-up voltage, for instance 24 volts, and series connected to a resistor 60 so that a change in resistance of coil 59 due to heating will not have much effect on the pick-up voltage.

The coil circuits of relays GFR, R and F are also under control by the contacts 61, 62 and 63, respectively, of a timing relay TR with a main coil 64 and a neutralizing coil 65. The main coil 64 is connected across the generator so as to measure the voltage imposed on the motor M, a resistor being series-connected with coil 64 but short-circuited as long as contact 15 of relay GFR is closed. The neutralizing coil 65 of relay TR receives excitation from mains X and Y through a calibrating resistor. The relay TR is adjusted to have a drop-out period corresponding to the decelerating characteristic of the motor M, the period of delay being, for instance, about 2 seconds.

The control relay 1CR has two contacts 67 and 68 controlled by a coil 69 whose circuit is associated with a "Fast-Slow" contact button 70 and a "Stop" button 71. Inching relay IR, with two contacts 72 and 73, has its control coil 74 connected with a "Jog forward" button 75 and a "Jog reverse" button 76, both connected with the reversing switch 27. The relays 1CR and IR, as well as relays 2F, DB, MC, F, R, and GFR are adjusted to pick up at a given percentage, for instance 60% of the voltage rating of their respective coils.

The system operates as follows. When the motor generator set is started, the generator voltage builds up to the normal low voltage of approximately 110 volts. With the selector switch 27 set for forward operation, as shown in Fig. 1, the relays F, 2FR, 2F and 3FR will pick up shortly before the voltage reaches this value. Relay F closes its contacts 28 and 29 and thus completes the circuit of motor field coil 6 for forward run of motor M. However, the motor armature circuit remains interrupted at contact 18 of contactor MC, and the braking resistor 22 remains connected across the motor armature at contact 23, so that the motor M remains at rest.

The subsequent actuation of the start (or "Fast-Slow") button 70 closes the circuit of coil 69. Relay ICR picks up and closes contacts 67 and 68. Contact 67 completes for coil 24 of relay DB the circuit X—71—70—67—46—24—58—Y so that the braking resistor 22 is disconnected at contact 23, while contact 25 completes the coil circuit X—71—25—19—57—Y of contactor MC so that the latter closes its main contact 18 and causes the motor to start accelerating.

Due to the closing of contact 18, coil 64 of the time relay TR receives excitation and causes the relay to pick up. This prepares, at contact 61, the coil circuit for relay GFR which circuit, however, remains still open at contact 52 of picked-up relay 3FR.

The subsequent release of button 70 has no effect on the condition then obtaining of contactor MC and relays DB and ICR, because contacts 20 and 21 of contactor MC close holding circuits for relays DB and ICR so that the relays then in picked-up condition, remain energized. However, the release of the start button 70 has the effect of energizing coil 54 of relay SR in the circuit X—71—21—68—70—54—57—Y. Contact 53 of relay SR opens and deenergizes the coils 49 and 50 of relays 2FR and 3FR, respectively. Relay 3FR drops out and completes the coil circuit X—61—52—26—31—17—57 of relay GFR.

Relay GFR opens its main contact 14 and thus renders the generator field winding 9 operative in addition to the field winding 8 previously in operation. As a result, the generator voltage is caused to build up from about 110 volts to about 232 volts. At approximately 186 volts, the relay IFR, whose coil circuit was previously completed at contact 16 of relay GFR, picks up and opens its contacts 56 and 57. The opening of contact 57 has the effect of rendering the resistor 58 effective in order to limit the voltage across the coils of relays F, MC, DC and ICR. The opening of contact 56 disconnects the coil 45 of relay FPR so that the motor field is weakened by the insertion of rheostat 40 in the motor field circuit. When the motor field current decreases to approximately 2.4 amperes, relay 2FR drops out and, by closing its contact 51, causes relay 2F to pick up and short-circuit, at contact 42, the resistor 41. From there on, the setting of rheostat 40 determines the motor speed so that the motor accelerates up to the value chosen by the adjustment of this rheostat and then continues running at that speed within the high speed band determined by the excitation of both generator field windings 8 and 9. This speed ranges between about 575 and 1725 R. P. M., in accordance with the numerical examples referred to above (see Figure 4).

When the "Fast-Slow" button 70 is depressed a second time, relay SR drops out and re-energizes coils 49 and 50 of relays 2FR and 3FR. Relay 2FR picks up and energizes coil 43 of relay 2F which, in turn, shorts out part of the rheostat 40 by closing the contact 42. As a result, the maximum motor speed now adjustable is limited, for instance, to 1150 R. P. M. (see curve F4 in Fig. 4). If the motor was running at a faster speed, it will now slow down. As soon as it reaches the speed of 1150 R. P. M., the relay 3FR picks up and deenergizes relay GFR by opening the contact 52. Contact 16 of relay GFR, in turn, deenergizes the relay IFR; and the latter, in sequence, deenergizes coil 45 of relay FPR. Relay GFR shorts out the generator field winding 9 and thus causes the generator voltage to decrease to about 110 volts. Relay FPR shorts out the remainder of rheostat 40 so that the motor slows down to the minimum speed of, for instance, 280 R. P. M. (see curve F2 in Fig. 4) and then continues running at that speed as long as the button 70 remains depressed.

The following release of button 70 causes relay SR to pick up again thus causing the relays 3FR, GFR, IFR, FPR, 2FR and 2F to operate in sequence as described above with the result of accelerating the motor to the set high speed.

It will be understood from the foregoing that the operator can select the desired normal operating speed of the lathe rotor and then, while the machine is working, reduce the speed for any length of time merely by depressing the "Fast-Slow" button 70. Hence, when the cutting tool approaches a hard spot or other irregularity of the work-piece requiring a reduction in cutting speed, a very simple and fast-acting actuation of a single electric contact will secure the desired performance.

The drive can be stopped at any time by depressing the "Stop" button 71. This causes the contactors and relays MC, DB, ICR and SR to drop out. The motor becomes disconnected from the generator, and the resistor 22 is immediately effective to brake the motor until it comes to rest. Relays 2FR, 2F and FPR pick up. After a delay of about two seconds, time relay TR drops out and causes relay FPR to drop out. The system is then in initial condition and ready for renewed operation.

If the selector switch 27 is set in "reverse" position, the above described operations occur in the same manner and sequence, except that then the relay R operates instead of the relay F so that the motor field winding 6 receives excitation of reversed polarity and causes the motor M to run in the reverse direction.

In either position of selector switch 27, with the above-described system elements in position for maintaining the motor M at rest, inching or jogging operations can be performed by depressing the jog button 75 or 76.

Actuation of the "Jog reverse" button 76, with switch 27 in the "forward" position, causes the forward relay F to drop out, while relay IR will pick up due to the energization of its coil 74 through the depressed button 76 in circuit X—76—74—57—Y. Contact 73 of relay IR then completes the coil circuit X—27—73—75—30—36—57—Y of relay R whose contacts 33 and 34 place excitation on motor field winding 6 for reverse operation. Contact 72 of relay IR energizes the coil circuit X—71—72—46—24—57—Y of the brake relay DB so that the braking resistor 22 is cut off and the contactor MC energized in circuit X—71—25—19—57—Y. The motor will now run in the reverse direction, and relays TR and FPR close to apply full field excitation to the motor by shorting rheostat 40. The motor then operates at lowest speed as long as the jog reverse button 70 remains depressed. The release of button 70 causes relays IR, R, DB, MC to drop out thus disconnecting and braking the motor while relay F picks up so that the system resumes its previous condition of readiness for forward operation.

When the "Jog forward" button 75 is depressed, with switch 27 in the "forward" position, relay F remains picked up the coil 74 of relay IR receives excitation so that contact 72 energizes the braking relay DB which, in turn, closes the coil circuit of contactor MC. Hence, the motor is now inched in the forward direction until button 75 is released.

If the selector switch 27 is set on "reverse" so that the reverse relay R is normally in picked-up condition, the actuation of the "Jog reverse" button 76 does not affect the relay R and causes merely the relay IR to energize the brake relay DB and the main contactor MC so that the motor will inch in the reverse direction. Actuation of the "Jog forward" button 75, with switch 27 in "reverse" position, causes relay R to drop out while relays IR, F, DB, and MC become energized for forward inching of the motor. Hence, the running direction of inching operations is exclusively determined by the selected jog button and is independent of the position of switch 27.

It will be recognized from the foregoing, that the excitation of the entire control equipment as well as that of the controllable generator and motor field windings is derived from the same generator G which energizes the drive motor M, and that due to the resistors 60 and 58, and the switching operation of relay IFR, the otherwise detrimental effect of the change in generated voltage is rendered ineffective as regards the proper operation of the relays.

Drive systems according to the invention can be modified in various respects as regards the arrangement, number, interconnection, and rating of the units comprising the system without departing from the gist and principles of our invention and within the scope of its essential features as set forth in the claims attached hereto.

We claim as our invention:

1. An adjustable speed drive, comprising a direct-current motor, a generator having an armature circuit for providing voltage for said motor and field means for varying said voltage, a relay system disposed for controlling the speed of said motor and having relay means for controlling the excitation of said field means and relay means for controlling the connection of said motor with said generator armature, circuit means connecting said relay system with said armature in order to provide energization for said relay means by voltage generated by said generator, resistance means series-connected with said circuit means, and a relay connected with said armature circuit and having contact means connected with said resistance means for controlling the latter to reduce the effective resistance value when said generator is controlled by said field means to generate voltage below a given magnitude.

2. An adjustable speed drive, comprising a direct-current drive motor, a generator having an armature connected to said motor to provide adjustable voltages therefor and a plurality of shunt field windings arranged in parallel relation to said armature to induce voltages of different magnitudes in said armature depending upon the number of said field windings that are excited at a time, a series field winding connected to said armature, circuit means disposed for controlling the excitation of said field windings and having relay means interconnected for sequential operation, and operator-actuable start means connected with said relay means for controlling said relay means to energize first one of said shunt field windings together with said series field winding and then another one of said shunt field windings for accelerating said motor to a desired speed.

3. An adjustable speed drive, comprising a direct-current drive motor, a generator having an armature connected to said motor to provide adjustable voltages therefor and two shunt field windings series-connected with each other and arranged in parallel relation to said armature to induce voltages of different magnitudes in said armature depending upon whether one or both of said field windings are energized, circuit means disposed for controlling the energization of said field windings and having relay means interconnected for sequential operation so as to first excite one of said windings and thereafter both windings when starting the motor, means for shorting one of said field windings, and operator-actuable control means having a contact movable between two positions and biased toward one of said positions, said contact being associated with said shorting means to temporarily deenergize one of said field windings when held in said other position.

4. An adjustable speed drive, comprising a direct-current drive motor, a generator having an armature connected to said motor to provide adjustable voltages therefor and having a plurality of poles, first and second shunt field windings arranged in parallel relation to said armature and disposed on different ones of said poles to induce voltages of different magnitudes in said armature depending upon whether one or both of said field windings are energized, a series field winding connected to said armature and disposed on the pole of said first shunt field winding, circuit means connected with said field windings and having relay means for sequentially energizing said first shunt field winding together with said series field winding and thereafter also said second shunt field winding for increasing the motor speed to a given high magnitude, said circuit means having operator-actuable control means for temporarily deenergizing said second shunt field winding to thereby reduce the motor speed.

5. An adjustable speed drive, comprising a direct-current drive motor, a generator having an armature connected to said motor to provide adjustable voltages therefor and having a plurality of pole pairs, first and second sets of shunt field windings disposed on different ones of said pole pairs to induce voltages of different magnitudes in said armature depending upon whether one or both of said sets of windings are energized, said sets of windings being connected in series with each other and arranged in parallel relation to said armature, a series field winding disposed on the pole pair of said first set of windings and connected in series with said armature and motor, control means having relay means interconnected for sequential operation and connected with said field windings for energizing, when operative, first said first set of windings together with said series field winding and then also said second set of windings for accelerating said motor to a given speed, and operator-actuable circuit means associated with said second set of field windings for temporarily shorting the latter to thereby reduce the speed.

6. An adjustable speed drive, comprising a direct-current drive motor having an armature and a motor field winding, a generator having an armature connected to said motor armature to provide adjustable voltage therefor and having a plurality of shunt field windings arranged to induce in said generator armature voltages of different magnitudes depending upon the number of energized shunt field windings, said shunt field windings being series connected relative to each other and arranged for parallel connection to said generator armature, relay means interconnected for sequential operation and connected with said shunt field windings for energizing first one and thereafter also another one of said shunt field windings for accelerating said motor to a speed of desired magnitude, a field circuit connected to said motor field winding for exciting the latter and comprising speed adjusting resistance means for determining said speed magnitude, and operator-actuable control means associated with said other shunt field winding and with said resistance means for deenergizing said other shunt field winding and changing the effective resistance of said resistance means for temporarily reducing said speed.

7. An adjustable speed drive, comprising a direct-current drive motor, a generator having an armature connected to said motor to provide adjustable voltage therefor and having two field windings arranged for connection to said armature to generate voltages of respectively different magnitudes in said armature depending upon whether one or both of said field windings are energized, a system of sequence relays having a rest condition and a run condition and being connected to said field windings for sequentially energizing first one and thereafter both of said windings when passing from said rest condition to said run condition, a start contact connected to said relay system so that, when said system is in rest condition, the actuation of said start contact causes said system to pass to run condition, said system including a relay connected to one of said windings for deenergizing the latter and contact means connecting said relay to said start contact when said system is in run condition so that the actuation of said start contact during said run condition controls said relay to deenergize said latter field winding for the period of the latter actuation in order to temporarily reduce the motor speed, and a stop contact connected with said relay system for controlling it to return from run condition to rest condition for stopping said motor.

8. An adjustable speed drive, comprising a direct-current drive motor having an armature and having a field circuit with field resistance means, a generator having an armature connected to said motor armature to provide energization of adjustable voltage for said motor armature, said generator having field windings for controlling said voltage, circuit means connected with said field windings for providing excitation therefor and including a system of sequence relays having a rest condition and a run condition and being connected to said field windings for controlling said excitation to progressively increase said voltage when passing from rest condition to run condition, a start contact connected to said relay system so that, when said system is in rest condition, the actuation of said start contact causes said system to pass to run condition, said system including relay means connected with said field windings for reducing said excitation under control by said start contact when said system is in run condition so that the actuation of said start contact during run condition causes a reduction of said voltage, circuit means forming part of said system and connecting said resistance means with said start contact when said system is in run condition so as to adjust said field circuit for low motor speed simultaneously with occurrence of said low voltage, and a stop contact connected with said relay system for controlling it to return from run condition to rest condition for stopping said motor.

9. An adjustable speed drive, comprising a direct-current motor having an armature and a field winding, a generator having an armature circuit series-connected to said armature to provide load voltage for said resistor and two field windings for controlling said voltage, said two generator field windings being series-connected with each other and shunt-connected with said armature circuit to cause said voltage to assume low and high values respectively depending upon whether one or both of said generator field windings are energized, circuit means connecting said motor field winding across said armature circuit and comprising a speed-controlling resistance means, a system of relays comprising a first relay connected with one of said generator field windings for short-circuiting it and a second relay connected with said resistance means for short-circuiting it, control means connected with said system of relays for causing said system to sequentially energize one of said shunt field windings and then both said shunt field windings for accelerating said motor to a high speed depending upon the resistance value of said resistance means, said control means having a contact associated with said first and second relays for causing, when actuated while said motor is running at said high speed, said second relay to short said one shunt field winding and said first relay to short said resistance means in order to reduce the motor speed to a low inching value.

GEORGE E. KING.
MARTIN H. FISHER.

REFERENCES CITED

The following references are of record in the file of this patent:

UNITED STATES PATENTS

| Number | Name | Date |
|---|---|---|
| 606,407 | Dobbie | June 28, 1898 |
| 1,255,400 | Ferris | Feb. 5, 1918 |
| 1,834,280 | Jupp et al. | Dec. 1, 1931 |
| 2,157,417 | Kneisley | May 9, 1939 |
| 2,201,863 | Jones | May 21, 1940 |
| 2,325,407 | Kaufman | July 27, 1943 |
| 2,370,672 | Lambach | Mar. 6, 1945 |